(12) United States Patent
Matsuoka et al.

(10) Patent No.: US 6,335,419 B2
(45) Date of Patent: Jan. 1, 2002

(54) POLYBENZAZOLE AND FIBER THEREOF

(75) Inventors: Go Matsuoka; Fuyuhiko Kubota, both of Shiga (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/731,394

(22) Filed: Dec. 5, 2000

(30) Foreign Application Priority Data

Dec. 6, 1999 (JP) .................................................. 11-346564

(51) Int. Cl.⁷ .................................................... C08G 63/00
(52) U.S. Cl. .............................................................. 528/183
(58) Field of Search ............................................... 528/183

(56) References Cited

FOREIGN PATENT DOCUMENTS

| EP | 0 481 402 A | 10/1991 |
|---|---|---|
| EP | 0 481 403 A | 10/1991 |
| EP | 0 805 173 A | 3/1997 |
| JP | 7157918 | 6/1995 |
| WO | WO 84/01160 | 3/1984 |

*Primary Examiner*—Terressa M. Boykin
(74) *Attorney, Agent, or Firm*—Morrison & Foerster LLP

(57) ABSTRACT

A polybenzazoleolybenzazole having a residual content of a BB-PBZ monomer of not more than 0.010 wt %, which is obtained by dehydration polymerization condensation of an AA-PBZ monomer of the formula (I)

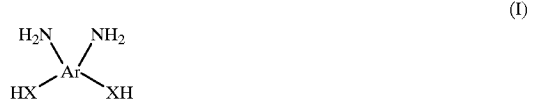

(I)

wherein Ar is a quadrivalent aromatic organic residue and X is O, S or NH, and a BB-PBZ monomer of the formula (II)

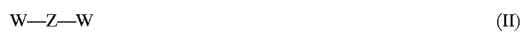

(II)

wherein Z is an optionally substituted divalent aromatic organic residue and W is a carboxyl group or a group derived from the carboxyl group, which is reactive with —XH in the AA-PBZ monomer. Because the residual content of the BB-PBZ monomer in polybenzazole is not more than 0.010 wt %, a polybenzazole fiber having a small filament denier can be produced stably at a high speed without suffering from thread breakage during the production.

9 Claims, No Drawings

POLYBENZAZOLE AND FIBER THEREOF

TECHNICAL FIELD OF THE INVENTION

The present invention relates to polybenzazole that can be formed into a fiber or a film having high strength and high heat resistance, and to a fiber obtained therefrom.

BACKGROUND OF THE INVENTION

Polybenzazole represented by polybenzobisoxazole, polybenzobisthiazole and polybenzobisimidazole can be formed into a fiber or a film having high strength (e.g., high tensile strength), high elastic modulus (e.g., high tensile modulus) and high heat resistance. For the high strength and high elastic modulus of polybenzazole to be expressed, it is preferable that the reaction for the production of polybenzazole be conducted to afford a number average polymerization degree of not less than 100, and the fiber or film be formed from a dope having a high polymer content affording liquid crystallinity. For this end, polybenzazole needs to be produced in polyphosphoric acid made to have a high concentration by the use of diphosphorus pentaoxide, as described in WO84/01160. The polymer dope resulting from this method contains a polymer having a rigid molecular chain at a high concentration. As a result, its viscosity becomes extremely high and processing thereof into a fiber becomes very difficult. Utilizing the superior physical properties, the spinning rate may be set high and the filament denier of a fiber may be made small, with the consequence that thread breakage occurs frequently and the productivity becomes significantly low.

To solve the problem of low productivity, improvements in connection with the apparatus have been made. For example, JP-A-7-157918 proposes the use of a nozzle having a revised shape for the production of a fiber, thereby to increase productivity by producing a fiber having a small filament denier at a high speed. However, the proposed improvement in the aspect of apparatus is insufficient to provide a desired level of the effect, suggesting the need to improve polybenzazole itself.

SUMMARY OF THE INVDENTION

It is therefore an object of the present invention to provide polybenzazole suitable for stable production of a fiber having a small filament denier at a high speed without suffering from thread breakage, and a fiber made therefrom.

According to the present invention, there is provided polybenzazole capable of accomplishing the above-mentioned object, which contains not more than 0.010 wt % of an unreacted BB-PBZ monomer.

The present invention provides polybenzazole obtained by dehydration polymerization condensation of an AA-PBZ monomer of the following formula (I) and a BB-PBZ monomer of the following formula (II), which polybenzazole has a residual content of the BB-PBZ monomer of not more than 0.010 wt %.

AA-PBZ monomer

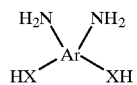

(I)

wherein Ar is a quadrivalent aromatic organic residue and X is O, S or NH;

BB-PBZ monomer

(II)

wherein Z is an optionally substituted divalent aromatic organic residue and W is a carboxyl group or a group derived from the carboxyl group, which is reactive with -XH in the AA-PBZ monomer.

The preferable embodiments are as follows. The above-mentioned polybenzazole wherein the AA-PBZ monomer is 4,6-diaminoresorcinol. The above-mentioned polybenzazole wherein the BB-PBZ monomer is terephthalic acid. The above-mentioned polybenzazole which is polyparaphenylene-benzobisoxazole. The above-mentioned polybenzazole which has a residual BB-PBZ monomer content of not more than 0.005 wt %. The above-mentioned polybenzazole which has a number average polymerization degree of not less than 30. The above-mentioned polybenzazole which has a number average polymerization degree of not less than 200.

The present invention also provides a fiber obtained by forming the above-mentioned polybenzazole.

In a preferable embodiment, the fiber has a tensile strength of not less than 35 g/d.

DETAILED DESCRIPTION OF THE INVENTION

The present invention is explained in detail in the following. The polybenzazole of the present invention is a polymer obtained by dehydration polymerization condensation of an AA-PBZ monomer of the above-mentioned formula (I) and a BB-PBZ monomer of the above-mentioned formula (II).

The AA-PBZ monomer used in the present invention is represented by the above-mentioned formula (I), wherein Ar is a quadrivalent aromatic organic residue and X is O, S or NH. Examples of the quadrivalent aromatic organic residue include bezenetetrayl group, biphenyltetrayl group and the like, with particular preference given to bezenetetrayl group.

Examples of the AA-PBZ monomer of the above-mentioned formula (I) include 4,6-diaminoresorcinol, 2,4-diamino-1,5-benzenedithiol, 2,5-diamino-1,4-benzenedithiol, 1,2,4,5-tetraaminobenzene, 3,3,4',4'-biphenyltetramine and the like. Inorganic acid salts (e.g., hydrochloride, hydrobromide, phosphate and the like) of these monomers can be also used.

The BB-PBZ monomer used in the present invention is represented by the above-mentioned formula (II), wherein Z is an optionally substituted divalent aromatic organic residue. Examples of the divalent aromatic organic residue include phenylene group, biphenylene group, naphthylene group and the like, with particular preference given to phenylene group. The substituent of the aromatic organic residue may be hydroxyl group, alkyl group having 1 to 4 carbon atoms, alkoxyl group having 1 to 4 carbon atoms, halogen atom, sulfonic acid group and the like, which may be used alone or in combination.

W is a carboxyl group or a group which is derived from the carboxyl group and which is capable of reacting with -XH in the AA-PBZ monomer of the above-mentioned formula (I). Examples thereof include a carboxyl group, a carboxylic ester group and a carbonyl halide group.

Examples of the BB-PBZ monomer of the above-mentioned formula (II) include dicarboxylic acids such as terephthalic acid, isophthalic acid, 4,4'-biphenyldicarboxylic acid, 2,6-naphthalenedicarboxylic acid and the like; dicarbonyl dihalides such as terephthaloyl dichloride, isophthaloyl dichloride, 4,4'-biphenyldicarbonyl dichloride, 2,6-naphthalenedicarbonyl dichloride and the like; dicarboxylic esters such as dimethyl terephthalate, dimethyl isophthalate, dimethyl 4,4'-biphenyldicarboxylate, dimethyl 2,6-naphthalenedicarboxylate and the like; and the like.

Therefore, the polybenzazole of the present invention can be polyparaphenylenebenzobisthiazole, polyparaphenylenebenzobisoxazole, polyparaphenylenebenzobisimidazole and the like, or a polymer having a repeat unit of the following formulas (1)–(3). The repeat unit may be of only one kind or two or more kinds.

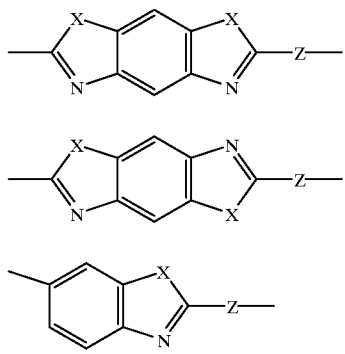

wherein X and Z are as defined above.

Examples of Z include the groups of the following formulas (4)–(7):

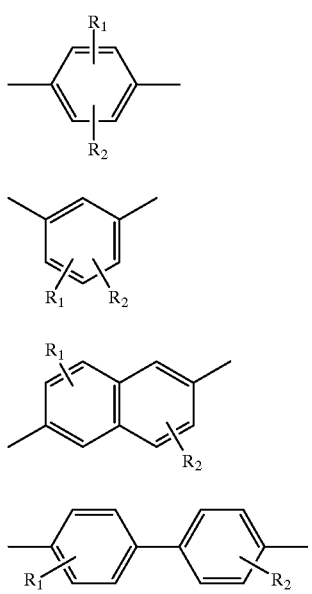

wherein $R_1$ and $R_2$ may be the same or different and each is hydrogen atom, hydroxyl group, alkyl group having 1 to 4 carbon atoms, alkoxyl group having 1 to 4 carbon atoms, halogen atom, sulfonic acid group and the like.

In the present invention, polybenzazole may be a copolymer, which may be random, sequential or block. In addition, not more than 50 wt % of polybenzazole may be copolymerized with polyaramid or polyimide.

For the desired improvement in the productivity, polybenzazole preferably used in the present invention is polyparaphenylenebenzobisthiazole, polyparaphenylenebenzobisoxazole or polyparaphenylenebenzobisimidazole.

In the present invention, the polybenzazole has a number average polymerization degree of preferably not less than 30, more preferably not less than 100, particularly preferably not less than 200. When the number average polymerization degree is less than 30, a fiber or film having high strength and high elastic modulus may not be obtained. The number average polymerization degree can be determined by dissolving the polymer in methanesulfonic acid and applying the resulting solution to gel permeation chromatography using a column packed with a strong anion exchange resin.

According to the present invention, the intrinsic viscosity of polybenzazole as measured in methanesulfonic acid at 25° C. is preferably not less than 10 dl/g, more preferably not less than 15 dl/g, particularly preferably not less than 20 dl/g. When the intrinsic viscosity is less than 10 dl/g, a fiber or film having high strength and high elastic modulus may not be obtained.

When the polybenzazole is polybenzobisoxazole, it can be produced by, for example, reacting 4,6-diaminoresorcinol and aromatic dicarboxylic acid or a derivative thereof. When it is polybenzobisthiazole, it can be produced by, for example, reacting 2,5-diamino-1,4-benzenedithiol and aromatic dicarboxylic acid or a derivative thereof. When it is polybenzobisimidazole, it can be produced by, for example, reacting 1,2,4,5-tetraaminobenzene and aromatic dicarboxylic acid or a derivative thereof.

This reaction is carried out in polyphosphoric acid or polyphosphoric acid additionally containing diphosphorus pentaoxide. In general, the concentration, upon phosphoric acid conversion, of polyphosphoric acid used for the reaction is 110–130 wt %. The ultimate concentration (upon phosphoric acid conversion) of polyphosphoric acid in the polymer dope is preferably 105–120 wt %, more preferably 112–118 wt %, particularly preferably 115–117 wt %.

The polymer dope needs to show liquid crystal characteristics to impart desirable physical property to a formed fiber. For this end, the polymer content is preferably about not less than 7 wt %, more preferably not less than 10 wt %, most preferably not less than 14 wt %. The maximum polymer content is subject to limitation due to the practicality in terms of solubility of polymer and viscosity of the dope. Therefore, a dope having a polymer content of not less than 30 wt % is seldom used, but a dope generally having a polymer content of not more than 20 wt % is mostly used.

The polymerization reaction temperature of the polymer is gradually raised from around 50–70° C. and the polymer is finally reacted at a temperature of not less than 200° C. As soon as the objective polymerization degree is achieved, the temperature is lowered to not more than 180° C. to prevent the reaction from proceeding further. A reaction temperature of not less than 230° C. is not preferable because it degrades the polymer and corrodes the reaction apparatus. The reaction time varies depending on the temperature, but it is approximately 2–5 hours at 70–130° C., 2–8 hours at 150–180° C., and 1 hour at 180–210° C.

A desired polymerization degree can be achieved by charging one of the AA-PBZ monomer and the BB-PBZ monomer at a greater molar ratio than the other and, where necessary, adding an amount insufficient of the other monomer at a later stage, thereby adjusting the molar ratio; by using a chain terminator, such as o-aminophenol, benzoic acid and the like; by lowering the temperature after a desired polymerization degree is achieved, thereby to substantially stop the reaction, while monitoring the viscosity of the polymer dope, and therefore, the polymerization degree thereof derived from the viscosity, using the rotating torque of screw and the like; or by other method. These methods may be used in combination.

In the context of the present invention, by the residual content of the BB-PBZ monomer is meant a ratio relative to the total weight of polybenzazole and unreacted BB-PBZ monomer.

The polybenzazole having the residual BB-PBZ monomer content of not more than 0.010 wt % can be obtained by the following methods, besides the above-mentioned methods for achieving a desired polymerization degree. In the case of polybenzobisoxazole, for example, 4,6-diaminoresorcinol is used 0.1–1.0 mol % in excess of aromatic dicarboxylic acid or a derivative thereof. In the case of polybenzobisthiazole, for example, 2,5-diamino-1,4-benzenedithiol is used 0.1–1.0 mol % in excess of aromatic dicarboxylic acid or a derivative thereof. In the case of polybenzobisimidazole, for example, 1,2,4,5-tetraaminobenzene is used 0.1–1.0 mol % in excess of aromatic dicarboxylic acid or a derivative thereof. They are reacted at a temperature of not less than 200° C. for not less than 5 minutes, and after the polymerization reaction, the unreacted BB-PBZ monomer is removed by reducing the pressure. When the BB-PBZ monomer is a sublimable monomer, it can be held at not less than 180° C. for a period of several minutes to several dozen minutes to allow active surface renewal in a high shear field as in a twin-screw kneader, thereby to remove the unreacted BB-PBZ monomer.

The desired polybenzazole can be also obtained by the following method. That is, the polymerization reaction is divided into two steps, wherein, in the first step, an AA-PBZ monomer is used 2.0–5.0 mol % in excess of the BB-PBZ monomer to give a polybenzazole oligomer having a low polymerization degree. In the second step, this oligomer and a slurry of BB-PBZ monomer, wherein a BB-PBZ monomer having a median diameter of not more than 3 $\mu$m has been thoroughly dispersed in polyphosphoric acid, are continuously fed into a single screw or multi screw extruder. The mixture is made to reside in the extruder for 5–30 minutes at 190–230° C. to allow reaction, whereby a polybenzazole polymer dope containing unreacted BB-PBZ monomer in a proportion of not more than 0.010 wt % is obtained. The slurry of the BB-PBZ monomer is obtained by stirring and dispersing the BB-PBZ monomer in polyphosphoric acid having a concentration of not less than 115% (upon phosphoric acid conversion) for not less than 24 hr in vacuo. This slurry preferably has a solid concentration of 3–15 wt % and a slurry viscosity of 50–500 poise (at 60° C.). Any deviation from this range may result in insufficient mixing with the above-mentioned oligomer in an extruder or a greater residual content of the BB-PBZ monomer.

The polybenzazole of the present invention thus obtained is characterized by the residual content of the BB-PBZ monomer of not more than 0.010 wt %, preferably not more than 0.005 wt %, more preferably not more than 0.001 wt %. When the residual content exceeds 0.010 wt %, thread breakage occurs during the high speed production of a fiber having a small filament denier.

In contrast, the residual AA-PBZ monomer scarcely exerts an influence. Even when it remained in about 0.5 wt %, as long as the residual content of the BB-PBZ monomer is not more than 0.010 wt %, a fiber having a small filament denier can be produced at a high speed without suffering from thread breakage.

There are many patents relating to fibers formed from polybenzazole. A fiber can be made from a polybenzazole polymer or copolymer obtained by the use of 4,6-diaminoresorcinol, by a method conventionally known, such as the methods described in U.S. Pat. No. 5,296,185 and U.S. Pat. No. 5,294,390.

The following explains in detail the production method of one embodiment of the present invention, polyparaphenylene-benzobisoxazole.

4,6-Diaminoresorcinol dihydrochloride, finely micronized terephthalic acid particularly preferably having a median diameter of not more than 3 $\mu$m, polyphosphoric acid (116 wt %) and diphosphorus pentoxide are charged in a reaction tank equipped with a ribbon-shaped impeller. The amount of each material is adjusted to make the polymer content 14 wt % and the polyphosphoric acid concentration after the reaction 116 wt % (upon phosphoric acid conversion), and 4,6-diaminoresorcinol dihydrochloride is added 0.1–0.5 mol % in excess of the finely micronized terephthalic acid.

After charging each of the above-mentioned materials, the temperature of the mixture is gradually raised from about 70° C. with stirring, and the mixture is reacted at about 160° C. for 5–8 hours. To promote the reaction, the mixture is fed into a reaction vessel having a strong shear force, such as that produced by a twin-screw kneader. The temperature is raised to 210° C. to carry out the reaction, and the viscosity of the polymer dope is monitored by observing the rotating torque of screw necessary for the stirring. The polymerization degree can be known from the viscosity of the polymer dope. When the desired polymerization degree is achieved, the temperature is immediately lowered to 170–180° C. Keeping the temperature at 170–180° C., the pressure of the system is lowered to not more than 10 mmHg. The residual unreacted terephthalic acid is removed from the reaction system to give a polymer dope of polyparaphenylenebenzobisoxazole.

Alternatively, 4,6-diaminoresorcinol dihydrochloride 2.0–5.0 mol % in excess of finely micronized terephthalic acid particularly preferably having a median diameter of not more than 3 $\mu$m, and the finely micronized terephthalic acid are charged in a reaction tank equipped with a ribbon-shaped impeller, in the same manner as in the above-mentioned method, together with polyphosphoric acid (116 wt %) and phosphorus pentoxide. After charging each of the above-mentioned materials, the temperature of the mixture is gradually raised from about 70° C. with stirring, and the mixture is reacted at about 160° C. for 5–10 hours to give an oligomer of polyparaphenylenebenzobisoxazole. This oligomer and a slurry of terephthalic acid having a viscosity of 160 poise (at 60° C.) and a solid concentration of 10 wt %, wherein ultra-finely micronized terephthalic acid having a median diameter of about 2.0 $\mu$m has been dispersed in polyphosphoric acid (about 116 wt %) and stirred for not less than 24 hr in vacuo, are continuously fed into a twin screw extruder. The twin screw extruder is heated to 190–220° C. to complete the reaction, whereby a polymer dope of polyparaphenylenebenzobisoxazole is obtained.

The polyparaphenylenebenzobisoxazole has a residual terephthalic acid content of not more than 0.010 wt %.

The obtained polymer dope is fed into a spinning part, and the dope is spun/discharged into a non-coagulative gas, such as nitrogen, from a spinneret having a hole diameter of 0.1–0.3 mm generally at a temperature of not less than 100° C. The obtained dope filament (filament before extraction of polyphosphoric acid) is taken up by a stress isolation apparatus (e.g., godet roller) at a constant rate of not less than 200 m/min, and stretched in the non-coagulative gas.

The dope filament solidified by cooling after spinning is led to a coagulation bath using water or an alcohol solution. The filament that passed the coagulation bath is passed through a godet roller, and is finally washed in an extraction bath using water, methanol and the like, until the content of phosphoric acid in the filament decreases to not more than 1.0 wt %, preferably not more than 0.5 wt %. Thereafter, the filament is neutralized with an aqueous sodium hydroxide solution and the like and washed with water.

After these steps, the filament is dried in a dryer using high temperature air and the like. The thus-obtained fiber preferably has sufficient tensile strength of not less than 35 g/d, more preferably not less than 40 g/d, and sufficiently high tensile modulus of not less than 1000 g/d, more preferably not less than 1100 g/d. The incidence of thread breakage during the spinning process is preferably not more than once/100000 m, more preferably not more than once/200000 m.

As used herein, the fiber encompasses a multifilament, a staple fiber and a monofilament.

The present invention is explained in detail by referring to comparative examples and examples. The present invention is not limited by these examples in any way. In the Examples, the intrinsic viscosity of the polybenzazole polymer was measured at 25° C. using methanesulfonic acid as a solvent. The residual content of BB-PBZ monomer was quantitatively determined by dissolving the polymer in methanesulfonic acid, extracting a low molecular weight material with a mixed solvent of water and hexafluoroisopropanol and applying the resulting solution to high performance liquid chromatography. In addition, the number average polymerization degree of polybenzazole was determined by dissolving the polymer in methanesulfonic acid and applying the resulting solution to gel permeation chromatography using a column packed with a strong anion exchange resin. The tensile strength and tensile modulus were measured according to JIS L 1096 (20° C., 65% RH, distance between chucks 20 cm, tensile strength 20 cm/min).

EXAMPLE 1

Diphosphorus pentaoxide (14.49 kg) was added to polyphosphoric acid (43.86 kg, 116%) under a nitrogen atmosphere. 4,6-Diaminoresorcinol dihydrochloride (9.10 kg) and finely micronized terephthalic acid (7.05 kg) having a median diameter of 2 μm were added, and the mixture was stirred and mixed in a reaction tank at 70° C. for 1 hour. The temperature was raised to 150° C. over 4 hours, and the mixture was heated and mixed for 10 more hours and fed into a single screw extruder heated to 210° C. with a gear pump. The extruded dope was fed into a twin screw extruder equipped with a vent line while cooling the dope to 180° C. The unreacted monomer was removed from the vent line by decreasing the pressure to give a polymer dope. The cis-polyparaphenylenebenzobisoxazole in the dope had an intrinsic viscosity of 30 dl/g and a number average polymerization degree of 440. The BB-PBZ monomer (terephthalic acid) remained unreacted in the polymer in a proportion of 0.002 wt %.

The above-mentioned steps were repeated 4 times. The obtained dope (300 kg) was maintained at a temperature of 170° C., delivered from the extruder to a gear pump, and spun from a spinneret having 116 holes, each having a hole diameter of 0.20 mm, at 170° C. Using cooling air at a temperature of 60° C., the obtained dope filaments were cooled, brought into contact with an aqueous phosphoric acid solution, and taken up by a godet roller at a rate of 600 m/min. The obtained filaments were washed until the phosphoric acid content decreased to 0.5 wt %, neutralized with an aqueous sodium hydroxide solution, washed with water and dried at 200° C. The obtained fiber (multifilament) had a tensile strength of 38 g/d and a tensile modulus of 1034 g/d. The incidence of thread breakage during the spinning process was once/1600000 m on average.

EXAMPLE 2

Diphosphorus pentaoxide (14.49 kg) was added to polyphosphoric acid (43.86 kg, 116%) under a nitrogen atmosphere. 2,5-Diamino-1,4-benzenedithiol dihydrochloride (10.47 kg), finely micronized 4,4'-biphenyldicarboxylic acid (5.15 kg) and finely micronized terephthalic acid (3.53 kg) having a median diameter of 2.2 μm were added, and the mixture was stirred and mixed in a reaction tank at 70° C. for 1 hour. The temperature was raised to 150° C. over 6 hours, and the mixture was heated and mixed for 120 more hours and fed into a single screw extruder heated to 215° C. with a gear pump. The extruded dope was fed into a twin screw extruder equipped with a vent line, while cooling the dope to 180° C. The unreacted monomer was removed from the vent line by decreasing the pressure to give a polymer dope. The copolymer of trans-polyparabiphenylenebenzobisthiazole and trans-polyparaphenylenebenzobisthiazole in the dope had an intrinsic viscosity of 30 dl/g and a number average polymerization degree of 420. The BB-PBZ monomer (4,4'-biphenyldicarboxylic acid and terephthalic acid) remained unreacted in the copolymer in a proportion of 0.001 wt %.

The above-mentioned steps were repeated 4 times. The obtained dope (300 kg) was spun in the same manner as in Example 1. The obtained fiber (multifilament) had a tensile strength of 41 g/d and a tensile modulus of 1081 g/d. The incidence of thread breakage during the spinning process was once/1250000 m on average.

EXAMPLE 3

Diphosphorus pentaoxide (7.25 kg) was added to polyphosphoric acid (21.93 kg, 116%) under a nitrogen atmosphere. 2,5-Diamino-1,4-benzenedithiol dihydrochloride (5.24 kg) and finely micronized terephthalic acid (3.20 kg) having a median diameter of 2.2 μm were added, and the mixture was stirred and mixed in a reaction tank at 70° C. for 1 hour. The temperature was raised to 150° C. over 6 hours, and the mixture was heated and mixed for 12 more hours to give a dope of an oligomer of trans-polyparaphenylenebenzobisthiazole. Separately, diphosphorus pentaoxide (7.25 kg) was added to polyphosphoric acid (21.93 kg, 116%) under a nitrogen atmosphere. 4,6-Diaminoresorcinol dihydrochloride (4.50 kg) and 4,4'-biphenyldicarboxylic acid (4.80 kg) were added, and the mixture was stirred and mixed in a reaction tank at 70° C. for 1 hour. The temperature was raised to 150° C. over 6 hours, and the mixture was heated and mixed for 12 more hours to give a dope of an oligomer of cis-polyparabiphenylenebenzobisoxazole.

The dopes of the above-mentioned two kinds of oligomers and finely micronized terephthalic acid (0.70 kg) were mixed in a reaction tank at 150° C. for 1 hour and fed into a single screw extruder heated to 215° C. with a gear pump. The extruded dope was fed into a twin screw extruder equipped with a vent line while cooling the dope to 180° C. The unreacted monomer was removed from the vent line by decreasing the pressure to give a polymer dope.

The block copolymer of trans-polyparaphenylenebenzobisthiazole and cis-polyparabiphenylenebenzobisoxazole in the dope had an intrinsic viscosity of 28 dl/g and a number average polymerization degree of 390. The BB-PBZ monomer (4,4'-biphenyldicarboxylic acid and terephthalic acid) remained unreacted in the block copolymer in a proportion of 0.004 wt %.

The above-mentioned steps were repeated 4 times. The obtained dope (300 kg) was spun in the same manner as in Example 1. The obtained fiber (multifilament) had a tensile strength of 42 g/d and a tensile modulus of 1081 g/d. The incidence of thread breakage during the spinning process was once/600000 m on average.

EXAMPLE 4

Diphosphorus pentaoxide (14.49 kg) was added to polyphosphoric acid (43.86 kg, 116%) under a nitrogen atmosphere. 4,6-Diaminoresorcinol dihydrochloride (9.10 kg) and finely micronized terephthalic acid (6.87 kg) having a median diameter of 3.0 μm were added, and the mixture was stirred in a reaction tank at 60° C. for 1 hour. The temperature was raised to 160° C. over 6 hours, and the mixture was heated and mixed for 10 more hours to give a dope of an oligomer of cis-polyparaphenylenebenzobisoxazole.

Separately, finely micronized terephthalic acid (7.30 kg) having a median diameter of 1.9 μm and polyphosphoric acid (90.00 kg, 116%) were charged in a reaction tank equipped with a ribbon-shaped impeller. The mixture was stirred and dispersed at 60° C. for 48 hour in vacuo at less than 1 mmHg to give a slurry of terephthalic acid. The slurry had a viscosity of 230 poise at 60° C.

The above-mentioned dope of cis-polyparaphenylenebenzobisoxazole oligomer and slurry of terephthalic acid were continuously fed into a twin screw extruder heated to 210° C. to give a polymer dope of cis-polyparaphenylenebenzobisoxazole. The viscosity of the polymer dope was adjusted by changing the amount of slurry of terephthalic acid to be fed, while monitoring the viscosity with the pressure of a tip of the extruder, thereby to achieve a desired polymerization degree. The cis-polyparaphenylenebenzobisoxazole in the dope had an intrinsic viscosity of 29 dl/g and a number average polymerization degree of 410. The BB-PBZ monomer (terephthalic acid) remained unreacted in the polymer in a proportion of 0.001 wt %.

The above-mentioned steps were repeated 4 times. The obtained dope (290 kg) was spun in the same manner as in Example 1. The obtained fiber (multifilament) had a tensile strength of 45 g/d and a tensile modulus of 1220 g/d. The incidence of thread breakage during the spinning process was once/1000000 m on average.

Comparative Example 1

Diphosphorus pentaoxide (14.49 kg) was added to polyphosphoric acid (43.86 kg, 116%) under a nitrogen atmosphere. 4,6-Diaminoresorcinol dihydrochloride (9.10 kg) and finely micronized terephthalic acid (7.06 kg) having a median diameter of 2 μm were added, and the mixture was stirred in a reaction tank at 70° C. for 1 hour. The temperature was raised to 150°C. over 4 hours, and the mixture was heated and mixed for 10 more hours and fed into a single screw extruder heated to 210° C. with a gear pump. The cis-polyparaphenylenebenzobisoxazole in the obtained polymer dope had an intrinsic viscosity of 32 dl/g and a number average polymerization degree of 460. The BB-PBZ monomer (terephthalic acid) remained unreacted in the polymer in a proportion of 0.024 wt %.

The above-mentioned steps were repeated 3 times. The obtained dope (200 kg) was spun in the same manner as in Example 1. The obtained fiber (multifilament) had a tensile strength of 40 g/d and a tensile modulus of 1041 g/d. The incidence of thread breakage during the spinning process was once/60000 m on average.

Comarative Exanple 2

In the same manner as in Example 3, a dope of the oligomer of trans-polyparaphenylenebenzobisthiazole and a dope of the oligomer of cis-polyparabiphenylenebenzobisoxazole were obtained. The dopes of these oligomers and finely micronized terephthalic acid (0.65 kg) having a median diameter of 2.1 μm were mixed in a reaction tank at 150° C. for 1 hour and fed into a single screw extruder heated to 210° C. with a gear pump. The block copolymer of trans-polyparaphenylenebenzobisthiazole and cis-polyparabiphenylenebenzobisoxazole in the obtained polymer dope had an intrinsic viscosity of 34 dl/g and a number average polymerization degree of 450. The BB-PBZ monomer (terephthalic acid and 4,4'-biphenyldicarboxylic acid) remained unreacted in the polymer in a proportion of 0.026 wt %.

The above-mentioned steps were repeated 4 times. The obtained dope (300 kg) was spun in the same manner as in Example 1. The obtained fiber (multifilament) had a tensile strength of 27 g/d and a tensile modulus of 1012 g/d. The incidence of thread breakage during the spinning process was once/40000 m on average.

Comparative Example 3

In the same manner as in Example 1 except that terephthalic acid having a median diameter of 6.0 μm was used instead of finely micronized terephthalic acid having a median diameter of 2 μm, a polymer dope was obtained. The cis-polyparaphenylenebenzobisoxazole in the obtained polymer dope had an intrinsic viscosity of 22 dl/g and a number average polymerization degree of 320. The BB-PBZ monomer (terephthalic acid) remained unreacted in the polymer in a proportion of 0.085 wt %.

The fiber (multifilament) obtained in the same manner as in Example 1 had a tensile strength of 32 g/d and a tensile modulus of 1010 g/d. The incidence of thread breakage during the spinning process was once/10000 m on average.

As is evident from the above explanation, because the residual content of the BB-PBZ monomer in polybenzazole is not more than 0.010 wt % according to the present invention, a polybenzazole fiber having a small filament denier can be produced stably at a high speed without suffering from thread breakage during the production.

This application is based on a patent application No. 346564/1999 filed in Japan, the contents of which are hereby incorporated by reference.

What is claimed is:

1. A polybenzazole having a residual content of a BB-PBZ monomer of not more than 0.010%, which is obtained produced by the dehydration polymerization condensation of an AA-PBZ monomer of the formula (I)

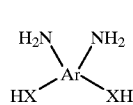

(I)

wherein Ar is a quadrivalent aromatic organic residue and X is O, S or NH, and a BB-PBZ monomer of the formula (II)

(II)

wherein Z is an optionally substituted divalent aromatic organic residue and W is a carboxyl group or a group derived from the carboxyl group, which is reactive with —XH in the AA-PBZ monomer.

2. The polybenzazole of claim 1, wherein the AA-PBZ monomer is 4,6-diaminoresorcinol.

3. The polybenzazole of claim 1, wherein the BB-PBZ monomer is terephthalic acid.

4. The polybenzazole of claim 1, which is polyparaphenylenebenzobisoxazole.

5. The polybenzazole of claim 1, wherein the residual content of the BB-PBZ monomer is not more than 0.005 wt %.

6. The polybenzazole of claim 1, which has a number average polymerization degree of not less than 30.

7. The polybenzazole of claim 1, which has a number average polymerization degree of not less than 200.

8. A fiber obtained by forming the polybenzazole of any of claim 1 to claim 7.

9. The fiber of claim 8, which has a tensile strength of not less than 35 g/d.

* * * * *